(12) United States Patent
Kindt et al.

(10) Patent No.: US 12,372,677 B2
(45) Date of Patent: Jul. 29, 2025

(54) ENERGY-RESOLVING PHOTON COUNTING DETECTOR PIXEL

(71) Applicant: Teledyne Dalsa B.V., Eindhoven (NL)

(72) Inventors: Willem Johannes Kindt, Eindhoven (NL); Bart Willem Jan Van Baarle, Eindhoven (NL)

(73) Assignee: TELEDYNE DALSA B.V., Eindhoven (NL)

( * ) Notice: Subject to any disclaimer, the term of this patent is extended or adjusted under 35 U.S.C. 154(b) by 291 days.

(21) Appl. No.: 18/162,437

(22) Filed: Jan. 31, 2023

(65) Prior Publication Data

US 2023/0251393 A1    Aug. 10, 2023

(30) Foreign Application Priority Data

Feb. 4, 2022    (EP) ..................................... 22155243

(51) Int. Cl.
    *G01T 7/00*          (2006.01)
    *G01T 1/24*          (2006.01)

(52) U.S. Cl.
    CPC .............. *G01T 7/005* (2013.01); *G01T 1/247* (2013.01)

(58) Field of Classification Search
    CPC ............ G01T 1/17; G01T 1/247; G01T 7/005
    See application file for complete search history.

(56) References Cited

U.S. PATENT DOCUMENTS

| | | | |
|---|---|---|---|
| 6,781,134 B1* | 8/2004 | Murray | G01T 1/244 250/370.12 |
| 8,159,286 B2* | 4/2012 | Rao | H04N 25/773 327/554 |
| 2002/0113211 A1* | 8/2002 | Nygard | G01T 1/17 250/336.1 |
| 2009/0302232 A1* | 12/2009 | Grosholz, Jr | G01T 7/005 377/2 |
| 2010/0329425 A1* | 12/2010 | Guo | G01T 1/247 378/91 |
| 2011/0121191 A1* | 5/2011 | Kappler | G01T 1/17 250/370.09 |
| 2013/0287175 A1* | 10/2013 | Nagai | G01T 1/247 250/336.1 |
| 2014/0203182 A1* | 7/2014 | Tsukiyama | G01T 1/247 250/370.08 |
| 2015/0139390 A1* | 5/2015 | Bellazzini | G01T 1/247 378/62 |
| 2016/0219686 A1* | 7/2016 | Nakayama | A61B 6/032 |
| 2016/0374629 A1* | 12/2016 | Kawata | A61B 6/54 378/19 |

(Continued)

FOREIGN PATENT DOCUMENTS

| | | |
|---|---|---|
| WO | 2012095710 | 7/2012 |
| WO | 2012158759 | 11/2012 |

*Primary Examiner* — David J Makiya
*Assistant Examiner* — Soorena Kefayati
(74) *Attorney, Agent, or Firm* — MH2 Technology Law Group, LLP (57) ABSTRACT

An energy-resolving photon counting detector pixel. The energy-resolving photon counting detector may include a plurality of such pixels. In an embodiment, the detector pixel is operable in a calibration mode, in which mode an offset unit determines a correction signal to be provided to the detecting unit and/or to the comparing unit for correcting an offset in the detecting unit and/or comparing unit.

19 Claims, 8 Drawing Sheets

(56) References Cited

U.S. PATENT DOCUMENTS

| | | | |
|---|---|---|---|
| 2017/0285186 A1* | 10/2017 | Roessl | G01T 7/005 |
| 2017/0350990 A1* | 12/2017 | Chmeissani Raad | G01T 1/247 |
| 2018/0164445 A1* | 6/2018 | Sacchi | A61N 5/1071 |
| 2020/0069266 A1* | 3/2020 | Cai | A61B 6/4241 |

* cited by examiner

ENERGY-RESOLVING PHOTON COUNTING DETECTOR PIXEL

FIELD

Aspects of the present disclosure relate to an energy-resolving photon counting detector pixel. Further aspects of the present disclosure relate to an energy-resolving photon counting detector comprising a plurality of such pixels.

BACKGROUND

Photon counting detectors capable of discriminating X-ray photon energies are known in the art. Compared to energy-integrating X-ray detectors working in a continuous mode, energy-resolving photon counting detectors are operated in a pulse mode. These detectors are capable of processing and registering the separate absorption events when an X-ray is absorbed by the detector material. Because photons are counted individually, energy-resolving photon counting detectors have the potential to offer superior noise characteristics when compared to energy-integrating detectors. This makes them attractive candidates to be used in computed tomography, CT, applications. For example, using energy-resolving photon counting detectors, contrast agents can be identified much better during a CT scan.

Figure 1:
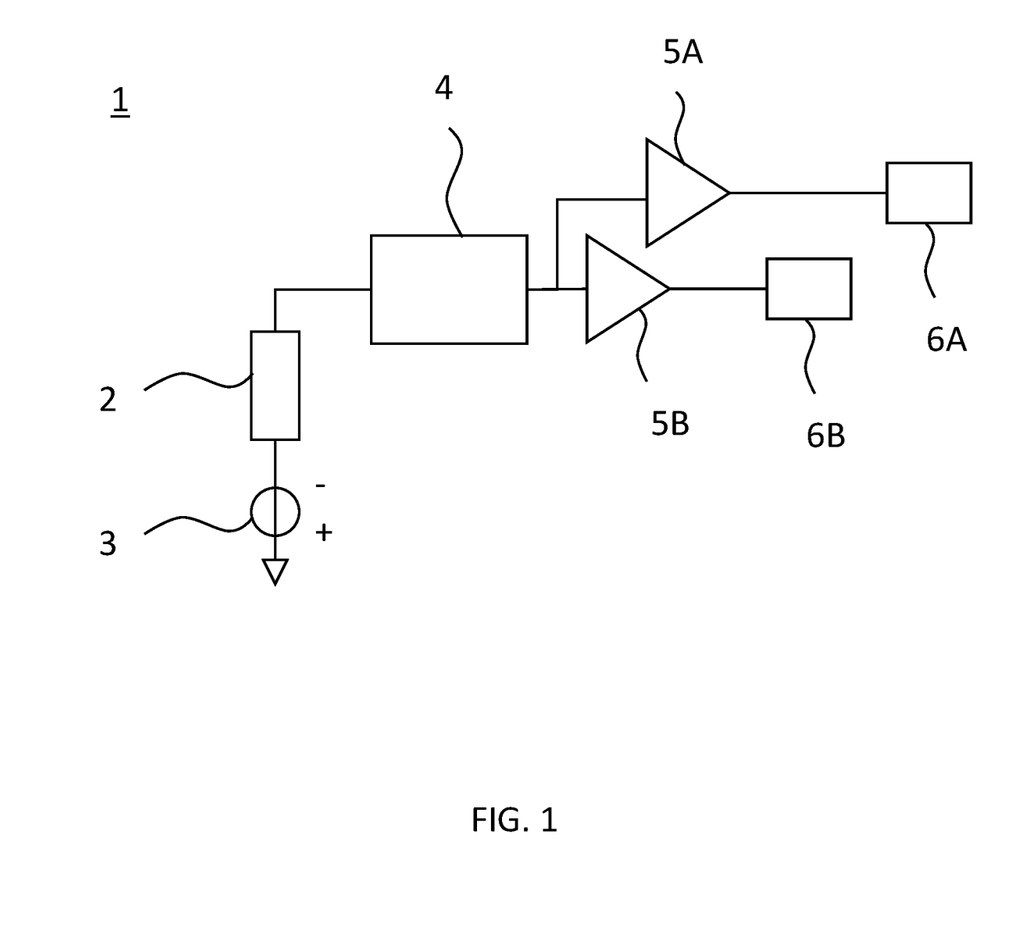
FIG. 1 schematically illustrates a known energy-resolving photon counting detector pixel.

An energy-resolving photon counting detector comprises a plurality of detector pixels that are arranged in a matrix of rows and columns. A schematic example of a known detector pixel for an energy-resolving photon counting detector is shown in FIG. 1. In this figure, pixel 1 comprises a photoconductor 2 configured for outputting a first signal as a result of absorbing a photon. Photoconductor 2 can for example be in the form of a photodiode. Alternatively, photoconductor 2 can comprise a piece of photo-absorbing material, such as Cadmium Telluride, arranged in between electrodes. This latter case is shown in FIG. 1, wherein a first electrode is negatively biased using a voltage source 3 and wherein a second electrode is connected to a detecting unit 4. Photoconductor 2 outputs a first signal as a result of absorbing a photon. This first signal comprises or is formed by free electrons that are generated by the photon absorption and that are repelled towards the second electrode by the large negative bias being present on the first electrode.

Detecting unit 4 generates a second signal in dependence of the first signal. This second signal is subsequently provided to a plurality of comparing units 5A, 5B that compare the second signal with respective thresholds. The outputs of comparing units 5A, 5B are connected to respective counters 6A, 6B. After processing many incident photons, the energy spectrum of the incident radiation can be determined by the values stored in counters 6A, 6B.

Figure 2:
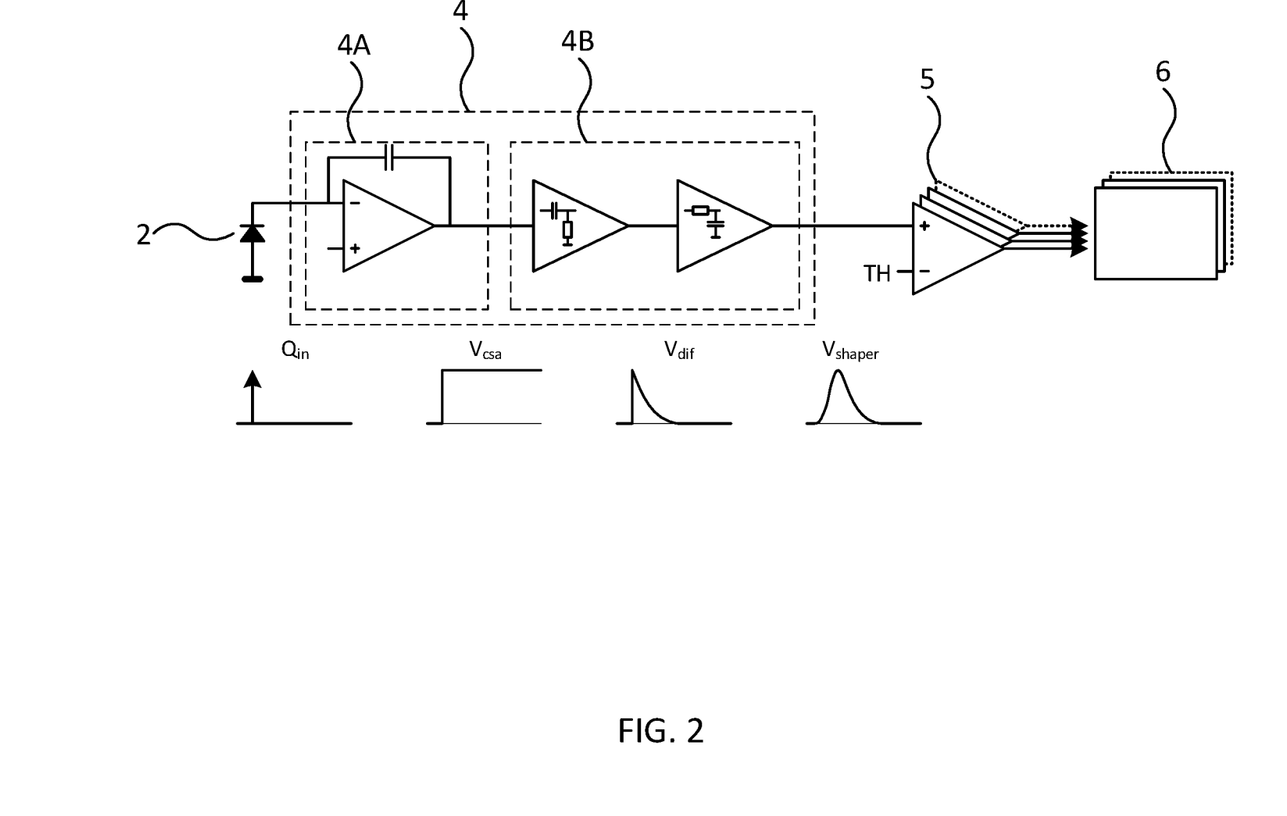
FIG. 2 illustrates a known implementation of the pixel detector of FIG. 1.

FIG. 2 illustrates a known implementation of the detector pixel of FIG. 1. Here, photoconductor 2 is formed by a photodiode, and detecting unit 4 comprises a charge sensitive amplifier 4A and a shaper circuit 4B. This latter circuit comprises a combination of a differentiation and an integrator. The various comparing units are combined to form a discriminator bank 5 that includes a plurality of comparators, and the counters are combined into a counter array 6.

As shown by the corresponding signal shapes illustrated below the various components, the first signal corresponds to a spike signal representative for the electrons Qin that were generated as a result of the absorption of a photon. This signal is processed by CSA 4A and is converted into a signal Vcsa. The step height depends on the energy of the absorbed photon. Signal Vcsa is then differentiated by the differentiator of shaper circuit 4B resulting in a signal Vdif. The differentiation will remove any DC components in signal Vcsa. Next, signal Vdif is integrated resulting in a signal Vshaper emerging as the second signal at the output of shaper circuit 4B. The maximum value of second signal Vshaper is indicative for the energy of the absorbed photon.

Discriminator bank, as well as components 4A and 4B, is/are typically realized using transistors, for example field-effect transistors such as MOSFETs. These transistors display a variation in their threshold voltages. Such differences may exist between transistors belonging to the same detector pixel and between transistors belonging to different detector pixels. As a result of the variation in threshold voltage, an offset is generated for the comparing unit and the detecting unit. For example, the transfer function of the detecting unit can be described by a function $S2=f1(S1)+Off1$, wherein f1 is a function of the first signal and Off1 a first offset. Similarly, the transfer function of the comparing unit can be described by a function $D(S2-TH-Off2)$, wherein D is a function for which $D(x)=1$ for $x>=0$ and $D(x)=0$ for $x<0$, wherein TH is a threshold value, and wherein Off2 a second offset. Combined, the overall transfer function can be described as $D(f1(S1)+Off1-TH-Off2)$. As can be understood from this transfer function, threshold voltage variation causes an incorrect determination of the energy of the absorbed photon.

Threshold voltage variation depends on temperature. In addition, threshold voltages may shift during the lifetime of the detector as a result of radiation damage. Hereinafter, the variation in threshold voltages between transistors will be referred to as the threshold offset.

A variation also exists with respect to the gain associated with the overall transfer function. Gain variation is typically associated with tolerances in the manufacturing process. However, unlike threshold voltage variation, gain variation is typically not dependent on temperature and does not significantly change during the lifetime of the detector.

A known approach to mitigate the problems associated with gain variation is to use trimming circuits. These circuits allow component values to be trimmed after manufacturing to minimize gain variation. Despite providing acceptable electrical results, the process of trimming can be time consuming.

A known approach to mitigate the problems associated with threshold voltage variation is to use a programmable or trimmable digital-to-analog converter, DAC, that inserts a correction current in the signal path. Such current needs to be inserted for each comparing unit separately.

The DACs are typically set once, namely after fabrication. Consequently, the factory set correction will not be able to address threshold voltage variation associated with a change of temperature and will not be able to address threshold voltage variation occurring during the lifetime of the detector.

Aspects of the present disclosure relate to an energy-resolving photon counting detector pixel in which the above-mentioned problem(s) do not occur or at least to a lesser extent.

According to an aspect of the present disclosure this object is achieved using the energy-resolving photon counting detector pixel defined in claim 1. This detector pixel comprises an offset unit and is operable in a calibration mode, in which mode the offset unit determines, in absence of the first signal and/or with the detecting circuit being in a state that is identical or equivalent to no photons being absorbed by the photoconductor, a correction signal to be provided to the detecting unit and/or to the comparing unit in dependence of the comparison result. The correction signal is configured for correcting an offset in the detecting unit and/or comparing unit. The detector pixel is further operable in a detecting mode, in which mode the detector pixel is configured to count photons that are absorbed by the photoconductor and in which mode the offset unit provides the determined correction signal to the detecting unit and/or comparing unit.

The abovementioned detector pixel uses its own circuitry for performing an autocalibration. An advantage of such detector pixel is that the detector need not be taken offline for performing the calibration. Rather, calibration can be performed, if needed, just prior to irradiation or illumination by the photons. In this manner, it can be ensured that calibration is performed with the detector having a temperature that is substantially the same as the temperature of the detector pixel in the detecting mode. As a result of the autocalibration, the accuracy of the determination of the incident photon energy can be improved.

During the calibration, the first signal can be absent, for example because no photons are absorbed by the photoconductor. Alternatively, photons are absorbed, but the first signal is prevented from reaching the detecting unit, or the detecting unit is configured to disregard the first signal. This allows the detecting unit to determine a correction signal that is independent from the first signal at that time.

The detecting unit can be configured for generating the second signal relative to a reference value, wherein a difference between the second signal and the reference value depends on the first signal when the detector pixel operates in the detecting mode. The detecting unit can be configured to output the second signal having a value substantially equal to the reference value if the first signal is absent, e.g. when the detecting pixel is operating in the calibration mode. However, when the first signal is non-zero, the signal outputted by the detecting unit will change. This change depends on the first signal.

In the calibration mode, the reference value and the threshold value may both equal a common value. Furthermore, the offset unit can be configured to determine, in the calibration mode, a correction signal to be provided to the detecting unit, and/or to the comparing unit in addition to the second signal generated by the detecting unit.

In the detecting mode, the reference value can be equal to a first reference value and the threshold value can be equal to a first threshold value. Furthermore, the offset unit can be configured to provide, in the detecting mode, the determined correction signal to detecting unit, and/or to the comparing unit in addition to the second signal generated by the detecting unit, for correcting an offset in the detecting unit and/or comparing unit.

In the calibration mode, the common value can be equal to the first threshold value. Alternatively, in the calibration mode, the common value can be equal to the first reference value. The present disclosure does not exclude common values to be used that are in between the first reference value and the first threshold value, or even other common values.

To enable the setting of the threshold value to the first threshold value or the common value, and to enable the setting of the reference value to the first reference value or the common value, the detector pixel may comprise a controller. The controller can be configured for setting the threshold value to the first threshold voltage and for setting the reference value to the first reference value when switching from the calibration mode to the detecting mode and/or for setting the threshold value and the reference value to the common value when switching from the calibration mode to the detecting mode. Alternatively, the detector pixel may comprise one or more switches for setting the threshold value to the first threshold value, for setting the reference value to the first reference value, and/or for setting the threshold value and the reference value to the common value, in response to one or more control signals. These one or more control signals may be received from a controller external to the detector pixel.

The comparison result can be a binary result. A binary result means that the comparison result can be either of two values. For example, the comparison result can be indicative for whether or not the second signal is greater than the first threshold value in the detecting mode or for whether or not the second signal is greater than the common value in the calibration mode. It should be noted that this comparison, without the correction signal being provided, is subjected to the abovementioned offset errors.

The correction signal can be determined in dependence of a change in the comparison result occurring due to the correction signal being provided. For example, the correction signal can be determined to be at a given value such that a small change in the correction signal from this value would cause a change in the comparison result. This small change can for example be in a range between 0 and 5 percent of the value of the correction signal.

The detecting unit and/or comparing unit may comprise field-effect transistors, FETs, such as metal-oxide-semiconductor field-effect transistors. The offset in the detecting unit and/or comparing unit can be at least partially a result of a variation in the threshold voltage among the FETs of the detecting unit and/or comparing unit.

The correction signal can be a current, and the offset unit can be configured to insert the determined correction current into a node of the comparing unit and/or detecting unit. Alternatively, the correction signal can be a voltage, and the offset unit can be configured to set a voltage at a node of the comparing unit and/or detecting unit to the determined correction voltage.

The offset unit may comprise a controller and a correction signal generating unit for generating the correction signal, wherein the controller is configured to control the correction signal generating unit in dependence of the comparison result. The controller can be configured to determine, when the detector operates in the calibration mode, whether the second signal is higher or lower than the threshold voltage based on the comparison result, and to change a value of the correction signal relative to a starting value of the correction signal until the correction signal has a value that is at or close to a value of the correction signal that would cause the comparison result to change. As an example, the correction signal is a current that is injected into the comparing unit.

If, during the calibration mode, the comparison result indicates that the second signal is smaller than the common value, the controller can be configured to increase the correction current until the comparison result changes, i.e. until the comparison result indicates that the second signal is greater than the common value. The correction current at the moment the comparison result changes, can be used as the correction current in the detecting mode.

The controller can be configured to change the correction signal based on successive approximation. Other schemes for quickly finding the correction current that would just cause a change in comparison result are not excluded. It should be noted that other correction currents close to the abovementioned correction current could equally be used although these currents would result in somewhat larger errors.

The offset unit may comprise an offset register configured to hold an offset correcting value. The correction signal generating unit can be configured to generate the correction signal based on the offset correcting value held in the offset register. Furthermore, the controller can be configured to change the offset correcting value held in the offset register for the purpose of said changing the value of the correction signal.

The offset unit can further be configured to output the correction signal when the detector pixel operates in the detecting mode for substantially simultaneously correcting a gain error associated with the detecting unit and/or comparing unit, and the offset in the detecting unit and/or comparing unit. For example, the offset unit may further comprise a gain register configured to hold a gain error correcting value. The correction signal generating unit can then be configured to generate the correction signal, when the detector pixel operates in the detecting unit, based on the offset correcting value held in the offset register and the gain error correcting value held in the gain register.

In an embodiment, only a gain error associated with the detecting unit is corrected for.

Assuming a linear relationship between the signal outputted by the detecting unit and the first signal in absence of threshold voltage variation, the overall transfer function can be described using $D((A+dA)S1+Off1-TH1-Off2)$, where TH1 is the first threshold voltage, A the gain of the detecting unit, and dA the gain variation in the detecting unit.

Close to the first threshold voltage TH1, the impact of the gain variation can be approximated by an offset. For example, when $S1=TH1/A$, the overall transfer function becomes $D(dATH1/A+Off1-Off2)$, showing that as a first approximation, the gain variation can be compensated for by using a correction signal similar to that for compensating Off1 and Off2.

Instead of using the comparing unit for determining a correction signal for correcting a gain error, the detecting unit and/or comparing unit may comprise a tunable or adjustable component for the purpose of changing the gain of the detecting unit and/or comparing unit.

In an embodiment, only a gain error associated with the detecting unit is corrected for using the tunable or adjustable component.

According to an aspect of the present disclosure, the process of determining the correction signal can be performed repeatedly, even just before an imaging sequence. More in particular, the correction signal can be determined taking into account a change in temperature of the detector pixel. Despite this possibility, the gain register and/or offset register may comprise temperature coefficients, and the offset unit can be configured for generating the correction signal based on the gain correction value and/or offset correcting value and the corresponding temperature coefficients, and a temperature of the detector pixel. The temperature of the detector pixel can be determined using a temperature sensor, either arranged inside the detector pixel or outside the detector pixel.

Alternatively, the correction signal generating unit may be configured to output the correction signal in dependence of the temperature of the detector pixel. For example, the transfer of the correction signal generating unit may be temperature dependent and this dependency can be programmable. In this manner, the relationship between the values held in the gain register and offset register and the outputted correction signal can be temperature dependent in a controllable manner.

The detecting unit may comprise a charge sensitive amplifier for converting the first signal into a voltage signal, and a shaper circuit for differentiating and integrating the voltage signal to thereby generate the second signal. The shaper circuit may comprise an operational transconductance amplifier having a first input connected to an output of the charge sensitive amplifier through a first resistor and a first capacitor, and an output connected to the first input through a parallel connection of a second capacitor and a second resistor. The operational transconductance amplifier may further comprise a second input for receiving a reference voltage equal to the reference value.

The comparing unit may comprise a voltage-to-current converter for converting a difference between the threshold value and the second signal into a current signal, and a current comparator for comparing the current signal to a threshold. Here, the second signal and threshold value can both be voltages, and the threshold used by the current comparator can be zero. The offset unit can be configured to combine the correction current with the current signal generated by the voltage-to-current converter prior to being compared by the current comparator.

Alternatively, the comparing unit may comprise a voltage comparator for comparing the second signal to the threshold value. The comparing unit may further comprise an amplifier for amplifying a difference between the second signal and the threshold value before being compared by the voltage comparator.

The detector pixel may comprise a plurality of the above-mentioned comparing units, offset units, and counters, each comparing unit being associated with a respective offset unit and respective counter. Each comparing unit is associated with a different threshold value used when the detector pixel operates in the detecting mode. In this case, the detector pixel can be configured to be operable in a respective calibration mode for each comparing unit. Alternatively, a single offset unit is used for determining a correction signal, wherein the determined correction signal is used for the plurality of comparing units.

The comparing units can be configured to substantially simultaneously compare the second signal to the respective thresholds using a common reference value when the detector pixel operates in the detecting mode.

The detector pixel can be configured to count X-ray photons. Additionally or alternatively, the photoconductor can be configured for outputting a first signal as a result of directly absorbing a photon. For example, the photoconductor may comprise a substrate of a material out of the group of materials comprising Cadmium Telluride, Cadmium-Zinc-Telluride, high-resistivity silicon, Gallium Arsenide, or amorphous Selenium.

According to a further aspect of the present disclosure, an energy-resolving photon counting detector is provided that comprises a plurality of pixels, wherein the detector pixels are configured as the detector pixel as defined above. The plurality of detector pixels can be arranged in a matrix of rows and columns.

DESCRIPTION OF THE DRAWINGS

Figure 3:
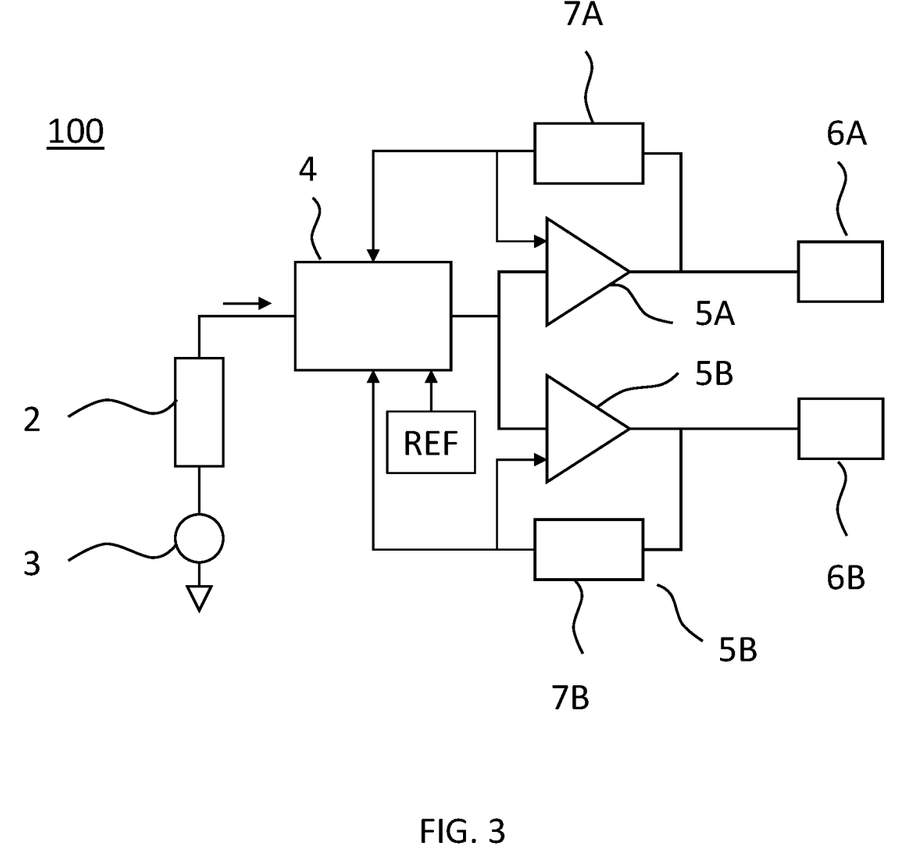
FIG. 3 schematically illustrates an energy-resolving photon counting detector pixel according to an aspect of the present disclosure.

So that the manner in which the features of the present disclosure can be understood in detail, a more particular description is made with reference to embodiments, some of which are illustrated in the appended figures. It is to be noted, however, that the appended figures illustrate only typical embodiments and are therefore not to be considered limiting of its scope. The figures are for facilitating an understanding of the disclosure and thus are not necessarily drawn to scale. Advantages of the subject matter claimed will become apparent to those skilled in the art upon reading this description in conjunction with the accompanying figures, in which like reference numerals have been used to designate like elements, and in which:

FIG. 3 illustrates a detector pixel 100 in accordance with an aspect of the present disclosure. In this figure, components identical or similar to the components of detector pixel 1 of FIG. 1 are referred to using the same reference signs.

As illustrated, detector pixel 100 comprises offset units 7A, 7B, that each provide a correction signal to detecting unit 4 and/or comparing unit 5A, 5B.

Detector pixel 100 is operable in a calibration mode. In this mode, photoconductor 2 does not provide a first signal to detecting unit 4 or this signal is prevented from reaching detecting unit 4 or this signal is prevented from impacting the output of detecting unit 4.

Typically, comparing units 5A, 5B compare a second signal outputted by detecting unit 4 to a given threshold value. Detecting unit 4 outputs the second signal relative to a reference value REF. For example, the second signal could have the form V2=REF−D−OFF1, wherein D is a component that is dependent, e.g. proportional, to the energy of the absorbed photon, and wherein OFF1 is an offset of detecting unit 4. Comparing units 5A, 5B compare V2 to a respective threshold TH and output a logical high when V2<=TH+OFF2 and a logical low when V2>TH+OFF2, wherein OFF2 is an offset of comparing unit 5A, 5B. Typically, the thresholds TH used by comparing units 5A, 5B are different. When a transition from a logical low to a logical high is detected by counter 6A, 6B, its counter value will be increased by one.

In the calibration mode, REF and TH are made equal. This could be realized by setting REF to TH, by setting TH to REF, or in general by setting REF and TH to a common value COM. Furthermore, in the calibration mode, D is equal to zero as the first signal is absent. For example, the calibration mode is started when photoconductor 2 is not receiving photons. This could be the case if the photon source is switched off. Therefore, in the calibration mode, and without any provision of a correction signal, comparing unit 5A, 5B would compare V2=REF−D−OFF1=COM-0-OFF1 to COM+OFF2. Consequently, if the combined offset OFF1+OFF2 is larger than zero, a logical high would be outputted and if the combined offset OFF1+OFF2 is smaller than or equal to zero, a logical low would be outputted.

According to an aspect of the present disclosure, comparing unit 5A, 5B and offset unit 7A, 7B are used for generating a correction signal for mitigating the combined effect that OFF1 and OFF2 have on the performance of detector pixel 100. More in particular, offset unit 7A, 7B determine a correction signal that is provided to detecting unit 4 and/or comparing unit 5A, 5B while operating in the calibration mode such that, ideally, comparing unit 5A, 5B is operated at its switching point, e.g. at the point where a transition in logical level is made.

In FIG. 3, the calibration mode is entered for each comparing unit 5A, 5B, and offset unit 7A, 7B, separately. This means that a first correction signal will be determined by comparing unit 5A and offset unit 6A, and a second correction signal will be determined by comparing unit 5B and offset unit 6B. In an embodiment, the correction signals are only provided to the comparing units 5A, 5B.

Both detecting unit 4 and comparing unit 5A, 5B comprise a plurality of nodes. Providing the correction signal to detecting unit 4 and/or comparing unit 5A, 5B may comprise setting a voltage at a node to a particular level such that comparing unit 5A, 5B is at its switching point. Alternatively, a current can be inserted into or extracted from a node of detecting unit 4 and/or comparing unit 5A, 5B. In a particular embodiment, providing the correction signal is equivalent or identical to changing the threshold value itself.

To determine the value of the correction signal at which comparing unit 5A, 5B is at its switching point, the output of comparing unit 5A, 5B is used. In the example above, if the output of comparing unit 5A, 5B is a logical low, the correction signal should be adapted such that the effect of the correction signal would be similar to that of an increasing value of D. The correction signal is adapted until a change in the logical level of the output of comparing unit 5A, 5B is detected.

Various schemes may be used to quickly find a correct value of the correction signal. One possible scheme is that first the sign of OFF1 is determined. Thereafter, the value of the correction signal is gradually adapted using the same increments or decrements until a change is observed in the output of comparing unit 5A, 5B. In a different scheme, the increments or decrements are not the same for each adaptation of the correction signal. For example, the increments or decrements could start with relatively high values, even those that would trigger a change in the output of comparing unit 5A, 5B, and end with relatively low values.

If the offset variation mainly occurs inside detecting unit 4, a calibration performed by a single offset unit and comparing unit may be sufficient. In such case, this single offset unit may provide the correction signal only to detecting unit 4. However, in most cases, offset variation occurs both in detecting unit 4 and comparing units 5A, 5B. Consequently, in these cases a calibration needs to be performed for each comparing unit 5A, 5B. In such cases, the correction signal is generally applied only to comparing units 5A, 5B. Furthermore, when multiple comparing units 5A, 5B are used and the correction signal is applied only to comparing units 5A, 5B, and the common value during the calibration mode is equal to the reference value, the calibration for correcting threshold voltage variation can be performed for multiple comparing units 5A, 5B simultaneously.

Once the correction signal is determined, detector pixel 100 may operate in the detecting mode. In this mode, REF is equal to REF 1 and TH is equal to TH1. In addition, the determined correction signal is provided to detecting unit 4 and/or comparing unit 5A, 5B. By applying the correction signal, the impact of threshold variation on the comparison result outputted by comparing unit 5A, 5B is mitigated.

FIGS. 4-7 illustrate implementations 100A-100D of detector pixel 100 of FIG. 3. In these figures, detecting unit 4 comprises a CSA 4A and a shaper circuit 4B. Here, CSA 4A comprises an operational transconductance amplifier, OTA, 41A having its non-inverting input connected to a reference voltage, such as ground, and its inverting input connected to photoconductor 2 (not shown in FIGS. 4-7). An integrating capacitor C1 is arranged in between the inverting input and output of OTA 41A.

Shaper circuit 4B comprises an OTA 41B having its inverting input connected to the output of OTA 41A through a resistor R2 and a capacitor C2. A parallel connection of a resistor R3 and capacitor C3 is arranged in between the inverting input and output of OTA 41B. The non-inverting input of OTA 41B is connected to a reference voltage $V_{ref\_shaper}$ through a switch 51 or to threshold voltage $V_{threshold}$ through a switch S2. Switches S1 and S2 are controlled using a controller that is arranged external to detector pixel 100 via a control signal CAL. In the calibration mode, with CAL having a logical high value, switch S2 is closed and switch 51 is open, and in the detecting mode, switch 51 is closed and switch S2 is open.

Typically, $V_{ref\_shaper}$ has a value that lies in a range between 1.0 and 1.4 V and $V_{threshold}$ has a range that lies between $V_{ref\_shaper}$ and 0.2 V. These ranges are based on using a 1.8 V CMOS technology for realizing detector pixel 100.

The output of OTA 41B is connected to the gate of a PMOS transistor Q1, which forms a differential pair with PMOS transistor Q2. The source of both Q1 and Q2 is connected to a current source 51. The drains of Q1 and Q2 are connected to respective branches of a current mirror comprising NMOS transistors Q3, Q4. The gate of Q2 is connected to $V_{threshold}$. The combination of Q1-Q4 acts as a voltage-to-current converter.

Figure 4:
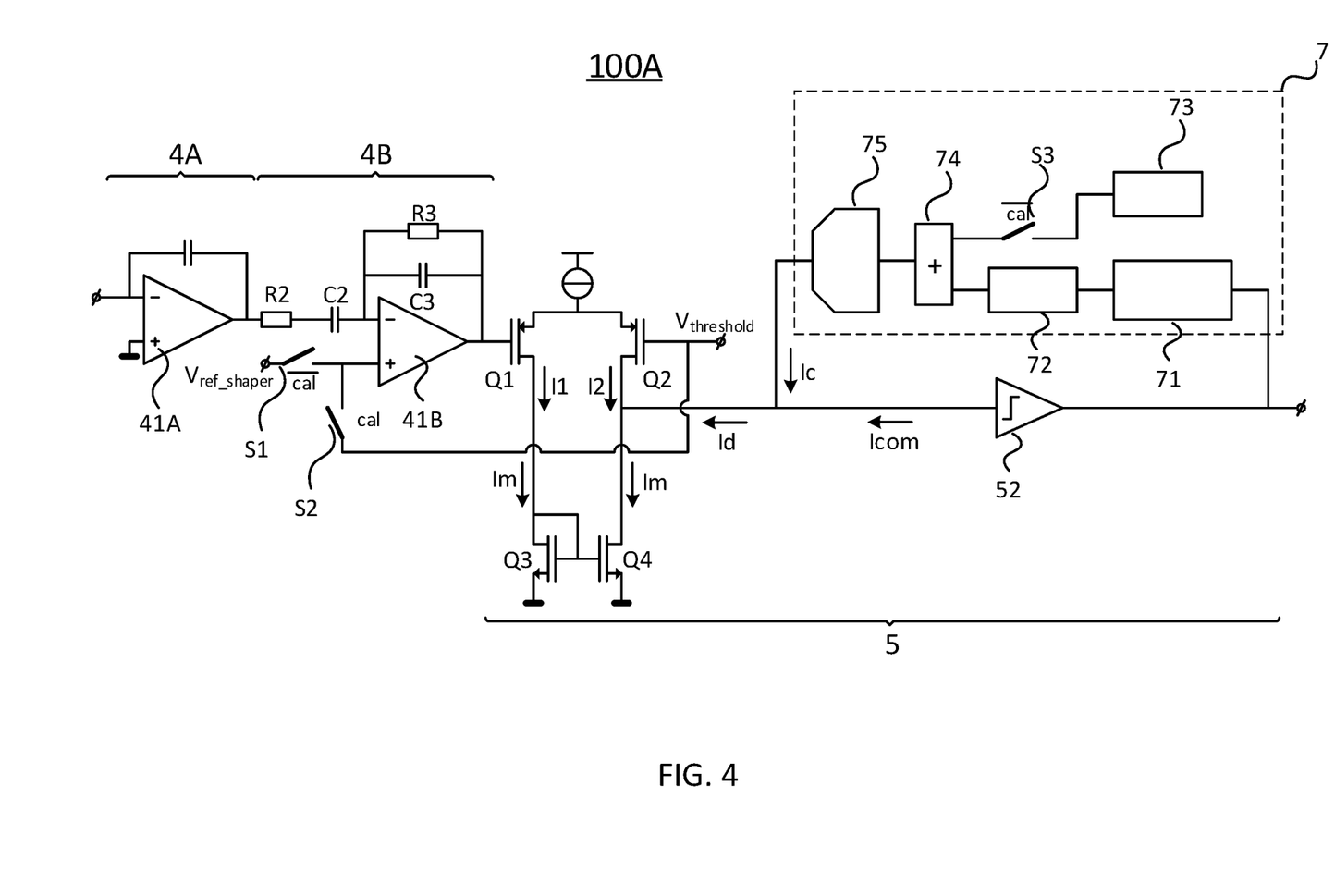
FIGS. 4-7 illustrate implementations of the pixel detector of FIG. 3.

The drain of Q2 is connected to a terminal of current comparator 52 that determines the direction of the incoming current. The output of current comparator 52 is connected to a counter 6 (not shown). In FIG. 4, components Q1-Q4, 51, 52 are part of comparing unit 5.

In FIG. 4, offset unit 7 comprises calibration logic circuitry 71. This latter circuitry is connected to the output of current comparator 52 and is configured to change a value held in an offset register 72. Offset unit 7 further comprises a gain register 73. Provided that switch S3 is closed, a summing element 74 adds the value held in gain register 73 to the value held in offset register 72 and feeds the resulting sum to a digital-to-analog converter 75 that converts the digital sum into an analog current that is inserted into the path between the output branch of the current mirror and current comparator 52.

A resistor may be put in parallel to C1 to allow capacitor C1 to discharge following a detection event. A fully discharged capacitor C1 will be taken as a starting point in the following discussion to explain the operation of detector pixel 100A. Furthermore, it will be assumed that pixel detector 100A is set in the calibration mode and that the value held in offset register 72 is zero. The calibration mode is activated by setting CAL to a logical high value.

In the absence of a signal from photodetector 2, the output of OTA 41A will be equal to 0V. The inverting terminal of OTA 41B will be at $V_{threshold}$ and, in an equilibrium condition, this voltage will equal the voltage drop over C2. Similarly, the output of OTA 41B will ideally be at $V_{threshold}$ as capacitor C3 will have discharged through R3. However, due to offset errors that occur inside OTA 41B, the actual output of OTA 41B will deviate from this value.

The current through the branches of the current mirror formed by Q3 and Q4 will be assumed identical. However, the gate-source voltages of Q1 and Q2 will generally not be identical due to the offset in detecting unit 4 and in Q1, Q2 themselves. As a result, the current outputted by current source 51 will not be distributed evenly over the branches.

For example, the drain current of Q1, Q2 is denoted using I1, I2, respectively, the current through either branch of the current mirror as Im, and the current flowing towards current comparator 52 as Id. In this case, I1=Im, and I2+Id=Im. Consequently, when Id>0, I2<I1, which corresponds to the output of OTA 41B being at a lower voltage than $V_{threshold}$. With Ic=0, Icom=Id, and current comparator 52, which functions as a current direction measuring unit, will output a logical high value. This output is used by calibration logic circuitry 71 to gradually increase the value held in offset register 72. By increasing this value, Ic will gradually increase thereby decreasing Icom. When Ic=Id, Icom will become zero causing current comparator 52 to operate at its switching point. When current comparator 52 switches its output, calibration logic circuitry 71 will stop changing the value held in offset register 72.

In the above, Q3 and Q4 were assumed identical. However, even if threshold voltage variation exists between these transistors, it can be corrected for using the same approach.

In the detecting mode, which is activated by setting CAL to a logical low value, the reference voltage fed to OTA 41B is set to $V_{ref\_shaper}$. When a first signal is generated by photoconductor 2, the voltage over C1 and the output voltage of OTA 41A is increased. Here, it is noted that the first signal generally comprises a flow of electrons towards the inverting terminal of OTA 41A. Due to the increase in the output voltage of OTA 41A, the voltage over C2 must decrease. This change is associated with a current flowing from the output of OTA 41A through C2 and the parallel combination of R3, C3, towards the output of OTA 41B. This current will decrease the output voltage of OTA 41B. After the detection event, the voltage over C3 will decrease due to current flow through R3.

The combination of R2, C2, R3, C3 and OTA 41B is an implementation of the differentiator and integrator mentioned in connection with FIG. 2. Here, capacitor C2 prevents any DC offsets in CSA 41A from affecting the output of OTA 41B, whereas high-frequency noise components are effectively shorted by C3. In the absence of R2, high frequency voltage signals at the output of OTA 41A would be differentiated by C2 and integrated in C3, resulting in a high-frequency voltage gain C2/C3. Resistor R2 is added to attenuate high frequency components further.

In the detecting mode, DAC 75 generates a current based on the values held in both offset register 72 and gain register 73. The value held in the latter register is used for compensating gain variation. This variation is generally determined by process variation in the thickness of the oxide layer of the various capacitors in the system, such as C3, and/or in the resistance of resistors R2, R3. Gain variation may result in adjacent pixels in a detector having a different gain. A positive attribute of gain variation is that it is generally temperature independent and generally remains constant over lifetime. Consequently, it is possible to perform a one-time calibration. This calibration should be performed for each comparing unit used in detector pixel 100A. Generally, when the first signal is such that current comparator 52 is close to its switching point, a deviation in the gain of the line-up can be described as a particular offset. This offset can be compensated in a manner similar to the offsets caused by threshold voltage variation.

To summarize, as a result of a first signal generated by photoconductor, the output of OTA 41B will decrease relative to reference voltage $V_{ref\_shaper}$. The output of OTA 41B will be compared to threshold voltage $V_{threshold}$. If this voltage is equal to $V_{ref\_shaper}$, the output of current comparator 52 will output a logical high value if the absorbed photon has a non-zero energy. By using a lower threshold voltage, it can be determined if the energy of the absorbed photon exceeds the particular energy levels associated with the lower threshold voltage. Typically, a detector pixel 100A comprises a plurality of comparing units 5, offset units 7, and counters.

Figure 5:
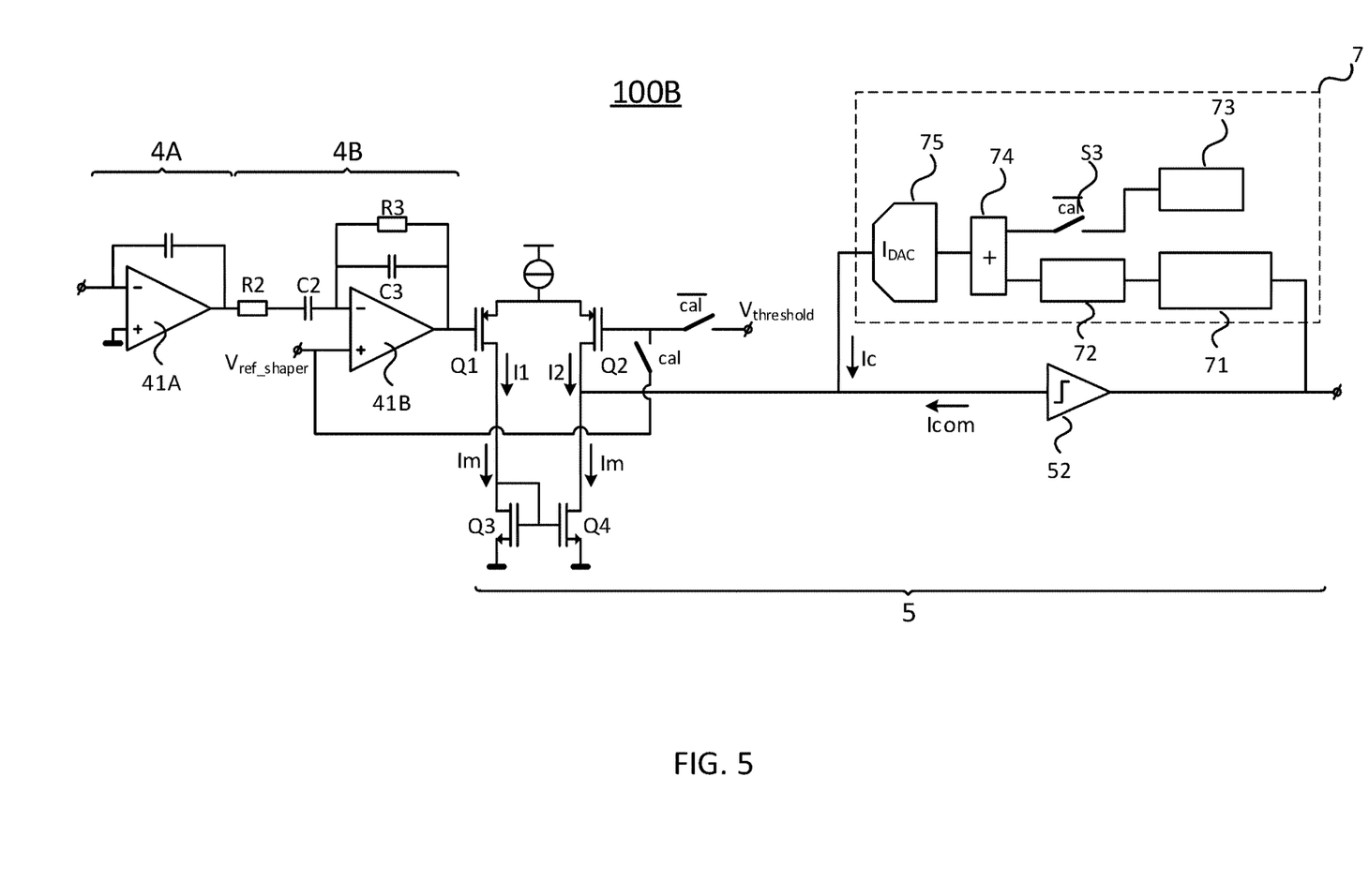
Figure 6:
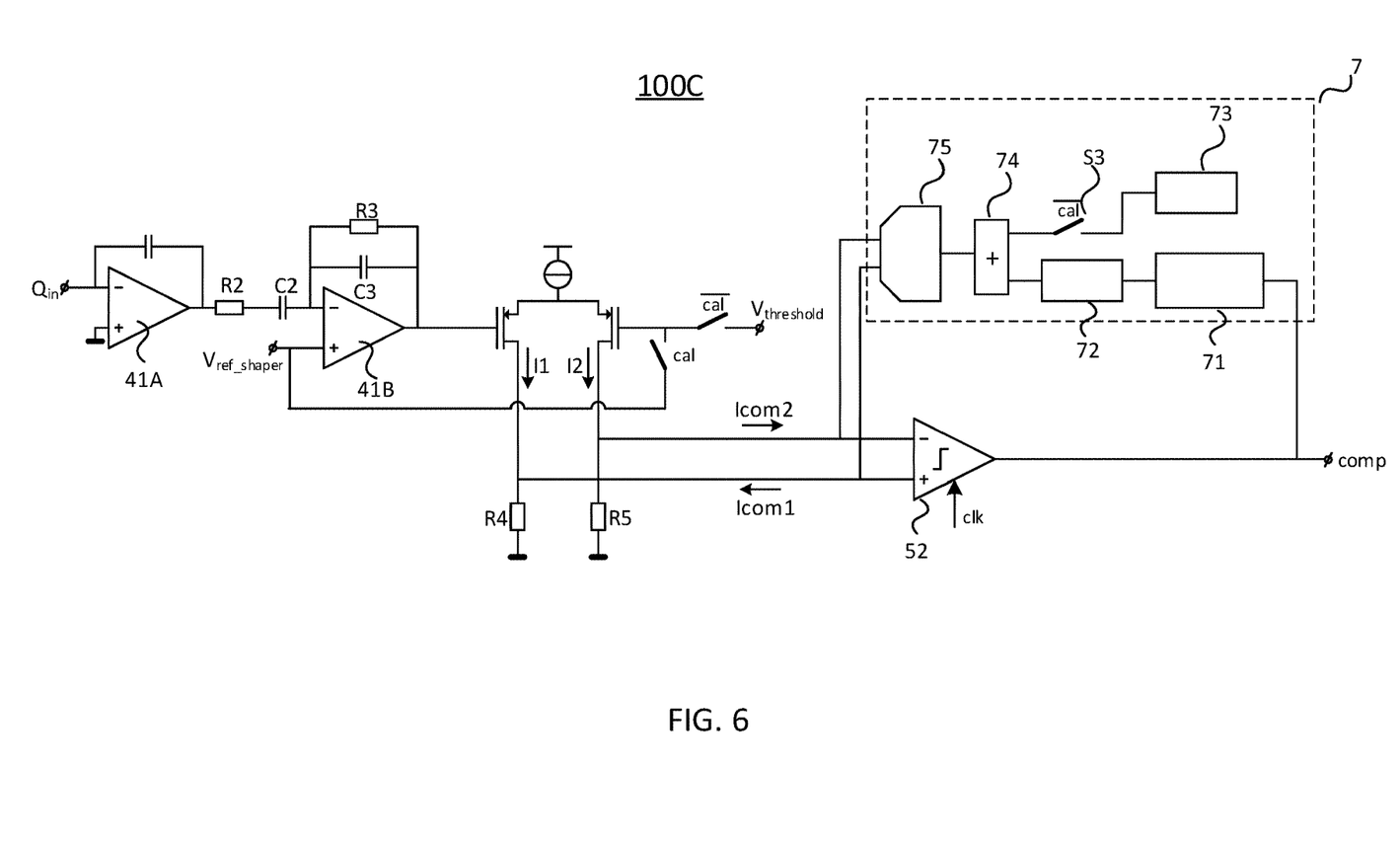
Figure 7:
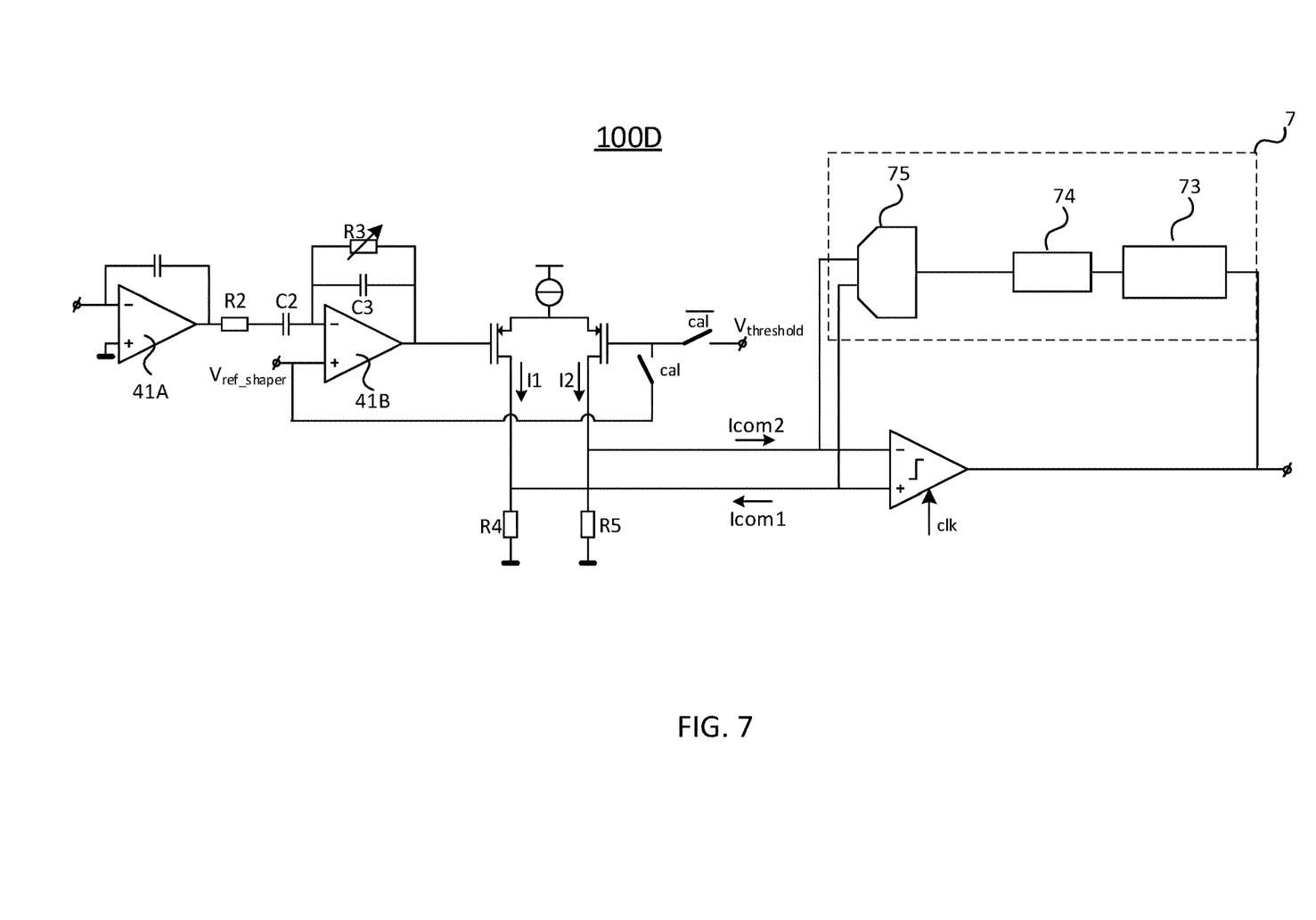

FIGS. 5-7 present different embodiments of an energy-resolving photon counting detector pixel in accordance with an aspect of the present disclosure.

In FIG. 5, detector pixel 100B uses a threshold voltage equal to $V_{ref\_shaper}$ in the calibration mode. This is realized by connecting switches S1, S2 differently.

In detector pixel 100C shown in FIG. 6, the voltage-to-current converter of FIG. 4 and is omitted. Rather the voltage difference between the output of OTA 41B and $V_{threshold}$ is amplified using the stage created by Q1, Q2 and R4, R5. In addition, DAC 75 outputs a differential current, as indicated by currents Icom1 and Icom2. The differential output voltage at the output of the stage appears between the top terminals of R4 and R5. This differential output voltage is given by $gm*R*(V_{out}-V_{threshold}-OFF)$ where gm is the transconductance of Q1 or Q2 (assumed equal) and R is the resistance of R4 or R5 (assumed equal) and $(V_{out}-V_{threshold})$ is the differential voltage that exists between the gates of Q1 and Q2 and OFF is an effective input voltage resulting from mismatches that exist in the shaper circuit as well as the amplification stage itself.

Voltages V4 and V5 are compared using a clocked voltage comparator 52. In the detecting mode, clocked comparator 52 should receive clock pulses based on a trigger block (not shown) that detects the peaks of the shaper circuit output voltage. During offset autocalibration, comparator 52 should receive clock pulses from calibration logic circuitry 71.

In FIG. 7, a detector pixel 100D is shown in which the gain error correction is not realized by offset unit 7. Instead, resistor R3 is trimmable to the extent that a resistance value of R3 can be modified after manufacturing. For example, a resistance of R3 can be changed by laser trimming. For the remaining part, detector pixel 100D is similar to detector pixel 100C shown in FIG. 6.

There are multiple manners in which the gain trim can be implemented. For instance, the gain trim can be applied into the system by a second DAC. In this case, a full adder to add the gain register value to the offset register value is not required. In this case the output current of that second DAC can be switched off during offset calibration.

Alternatively, the gain trim can be implemented by inserting a programmable gain stage in the signal path. Because only slight gain variations have be trimmed, this gain trim stage could be as simple as a programmable resistive divider with, for instance a gain programmable from 0.9 to 1.0 in steps of 0.005. In this case the typical attenuation could be 0.95× and the gain can be trimmed up or down by +1-5%.

Alternatively, the gain trim can be implemented by trimming one of the four passive elements in the shaper circuit. A small variation in one of these components will cause a small variation in the gain of the circuit, which is sufficient to counteract a small variation of the gain. This will also cause a small variation in the time constant of the shaper circuit, but since this variation is small, it is not a problem for the operation of the circuit.

If the gain correction relies on the injection of a certain additional offset into the signal path, then the gain correction should be register programmable. A user can adjust the energy threshold settings in the field. If the user increases the threshold level, then the amount of offset that is injected into the signal path to compensate the gain error should be increased in a pro-rated manner, because the gain error is a relative error.

If the gain error is compensated by adding an offset in the system using the DAC, then ideally the amount of gain trim that the DAC generates in response to the gain trim setting should be temperature independent. This can be achieved by making sure that the temperature coefficient of the DAC, expressed as an input error voltage at the input of the shaper circuit, is zero.

An example of a trimming procedure in the factory is as follows. As a first step, the first signal is disabled. This can be achieved either by turning off the photon source, e.g. X-ray source, or by powering down the CSA or by disconnecting the CSA from the shaper circuit. Next, the offset autocalibration as described above is performed to make sure that the threshold offsets in the system are cancelled. Then, the first signal is enabled allowing the sensor to be exposed to a monochromatic x-ray source. Next, the threshold level is slowly swept. For a low $V_{threshold}$, the count rate in all detector pixels will be very high, and as $V_{threshold}$ increases, the count rate will drop. The value of $V_{threshold}$ at which the count rate decreases, e.g. to 50% of the original value, is a measure for the gain in each detector pixel. The mean value of the gain error is caused by a systematic error due to feedback capacitor tolerance in the production process. This means that the gain error value, which is the same for all detector pixels, can be compensated by adjusting $V_{threshold}$. The mismatch in the gain for all detector pixels can be compensated by injecting a trim signal that is different for each detector pixel by using the gain trim register.

The procedure for using the detector pixel with offset and programmable gain correction in the field is as follows. At startup, the proper gain trim coefficients are uploaded into the detector pixel. These gain trim coefficients have to be calculated based on the threshold settings and a gain error map that was determined during factory trim. At startup and at various conveniently chosen time points, the gain trim is disabled and the offset autocalibration is ran. For image acquisition in the detecting mode, the gain trim is enabled and the offset trim coefficients are used that were found during autocalibration. In embodiments in which the gain error is trimmed in the manner described in connection with FIG. 7, the gain trim does not have to be disabled during offset autocalibration.

The offset calibration logic can be implemented in various manners. One possible implementation is to use successive approximation in the calibration logic. Alternatively, instead of in a register, the offset trim code can be stored in a counter. The MSBs of the counter are routed to the DAC that injects the offset in the analog system. During offset trim, clock pulses are applied to the counter. In response to the clock pulses, the counter counts up or down depending on the output of the comparator. If the comparator output is high, the counter counts up, and as a result the DAC injects a larger current, which in turn makes the signal go down. The LSBs of the counter filter out the noise. If the comparator is just at its triggering point, then the output of the comparator is determined by noise. In that case the counter is counting up just as often as down. This causes the MSBs of the counter to remain stable. Changes in the MSBs can only occur if there are multiple counts in the same direction. Of course, it is possible that the MSBs of the counter still make a single digital number transition, but the impact of such a small signal is negligible in the overall system.

Figure 8:
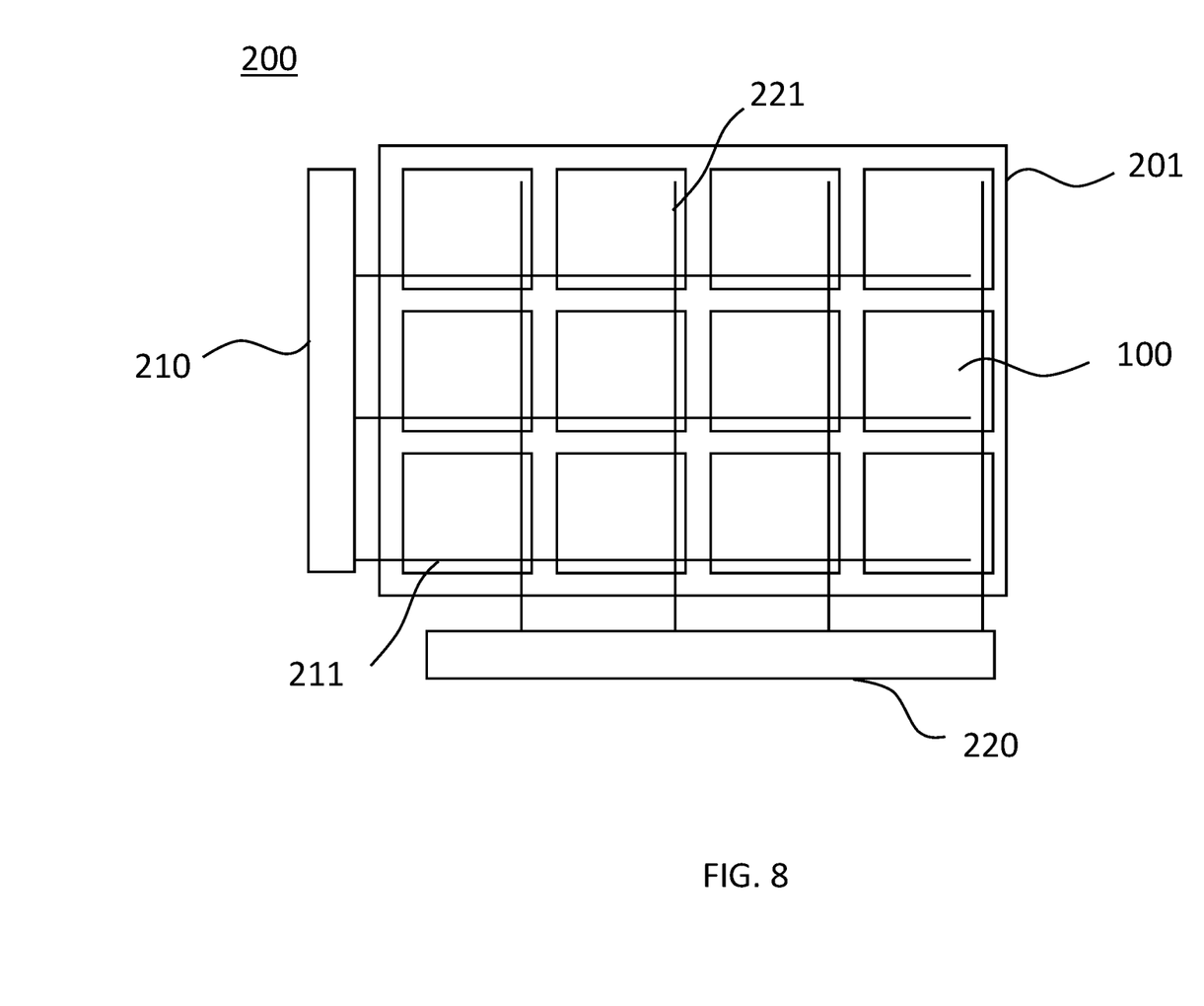
FIG. 8 illustrates a detector according to an aspect of the present disclosure.

FIG. 8 illustrates an energy-resolving photon counting detector 200 according to an aspect of the present disclosure. It comprises a substrate assembly 201 on which a plurality of detector pixels 100 is arranged in a matrix of rows and columns. Substrate assembly 201 comprises the photoconductor material and the semiconductor material used for realizing the electronic circuitry of detector pixel 100. Typically, substrate assembly 201 comprises a substrate for the photoconductor and a separate substrate for the electronic circuitry.

Detector 200 comprises a selecting unit 210 that is configured to select a row of pixels 100 for readout the values in the counters of pixels 100 in a given row. In addition, selecting unit 210 provides a control signal CAL for selecting either the detecting mode or the calibration mode of pixels 100. Generally, control signal CAL is provided to all pixels 100 of detector 200 simultaneously, whereas selecting rows of pixels 100 is performed on a row-by-row basis. Detector 200 further comprises readout circuitry 220 for reading out the counter values of pixels 100 using a plurality of bus lines 221. Readout circuitry 220 can provide the collected values to an external device for further processing.

Typically, selecting unit 210 and readout circuitry 220 are arranged on the same substrate of substrate assembly 201 as the substrate on which the electronic circuitry is realized.

In the above, the present invention has been described using detailed embodiments thereof. However, the present invention is not limited to these embodiments. Instead, various modifications are possible without departing from the scope of the present invention which is defined by the appended claims and their equivalents.

Particular and preferred aspects of the invention are set out in the accompanying independent claims. Combinations of features from the dependent and/or independent claims may be combined as appropriate and not merely as set out in the claims.

The scope of the present disclosure includes any novel feature or combination of features disclosed therein either explicitly or implicitly or any generalization thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

Features which are described in the context of separate embodiments may also be provided in combination in a single embodiment. Conversely, various features which are, for brevity, described in the context of a single embodiment, may also be provided separately or in any suitable sub combination.

The term "comprising" does not exclude other elements or steps, the term "a" or "an" does not exclude a plurality. Reference signs in the claims shall not be construed as limiting the scope of the claims.

The invention claimed is:

1. An energy-resolving photon counting detector pixel, comprising:
    a photoconductor configured for outputting a first signal as a result of absorbing a photon;
    a detecting unit for generating a second signal in dependence of the first signal;
    a comparing unit configured to compare the second signal to a threshold value and to output a corresponding comparison result;
    a counter connected to the comparing unit and configured to count in dependence of a change in the comparison result; and
    an offset unit,
    wherein the detector pixel is operable in:
        a calibration mode, in which mode the offset unit determines, in absence of the first signal and/or with the detecting unit being in a state that is identical or equivalent to no photons being absorbed by the photoconductor, a correction signal to be provided to the detecting unit and/or to the comparing unit; and
        a detecting mode, in which mode the detector pixel is configured to count photons that are absorbed by the photoconductor and in which mode the offset unit provides the determined correction signal to the detecting unit and/or comparing unit,
    wherein the correction signal is determined in dependence of the comparison result, said correction signal being configured for correcting an offset in the detecting unit and/or comparing unit,
    wherein the detecting unit and comparing unit comprises field-effect transistors (FETs) and wherein the offset in the detecting unit and/or comparing unit is at least partially a result of a variation in the threshold voltage among the FETs of the detecting unit and/or comparing unit.

2. The detector pixel according to claim 1, wherein the correction signal is a current, and wherein the offset unit is configured to insert the determined correction current into a node of the comparing unit and/or detecting unit.

3. The detector pixel according to claim 1, wherein the correction signal is a voltage, and wherein the offset unit is configured to set a voltage at a node of the comparing unit and/or detecting unit to the determined correction voltage.

4. The detector pixel according to claim 1, wherein the detecting unit is configured for generating the second signal relative to a reference value, wherein a difference between said second signal and the reference value depends on the first signal when the detector pixel operates in the detecting mode.

5. The detector pixel according to claim 1, wherein the comparison result is a binary result.

6. The detector pixel according to claim 1, wherein the correction signal is determined in dependence of a change in the comparison result occurring due to the correction signal being provided, wherein the correction signal is determined to be at a given value such that a small change in the correction signal from this value would cause a change in the comparison result, wherein the small change is in a range between 0 and 5 percent of the value of the correction signal.

7. The detector pixel according to claim 1, wherein the offset unit comprises a controller and a correction signal generating unit for generating the correction signal, wherein the controller is configured to control the correction signal generating unit in dependence of the comparison result.

8. The detector pixel according to claim 1, wherein the offset unit is further configured to output said correction signal when the detector pixel operates in the detecting mode for substantially simultaneously correcting a gain error associated with the detecting unit and/or comparing unit, and the offset in the detecting unit and/or comparing unit, wherein the offset unit further comprises a gain register configured to hold a gain error correcting value, wherein the correction signal generating unit is configured to generate the correction signal, when the detector pixel operates in the detecting mode, based on the offset correcting value held in the offset register and the gain error correcting value held in the gain register.

9. The detector pixel according to claim 1, wherein the offset unit is further configured to output said correction signal when the detector pixel operates in the detecting mode for substantially simultaneously correcting a gain error associated with the detecting unit and/or comparing unit, and the offset in the detecting unit and/or comparing unit,
wherein the detecting unit and/or comparing unit comprises a tunable or adjustable component for the purpose of changing the gain of the detecting unit and/or comparing unit.

10. The detector pixel according to claim 1, wherein the comparing unit comprises a voltage comparator for comparing the second signal to the threshold value, wherein the comparing unit further comprises an amplifier for amplifying a difference between the second signal and the threshold value before being compared by the voltage comparator, wherein the offset unit is configured to determine, in the calibration mode and in absence of the first signal and/or with the detecting unit being in a state that is identical or equivalent to no photons being absorbed by the photoconductor, a correction signal to be provided to the detecting unit and/or to the amplifier and/or to the comparing unit in dependence of the comparison result, and wherein the offset unit is configured to provide, in the detection mode, the determined correction signal to the detecting unit and/or amplifier and/or comparing unit.

11. The detector pixel according to claim 1, wherein the detector pixel is configured to count X-ray photons.

12. An energy-resolving photon counting detector comprising a plurality of detector pixels, wherein each of the plurality of detector pixels are configured as the detector pixel as defined in claim 1.

13. The detector pixel according to claim 2, wherein the comparing unit comprises a voltage-to-current converter for converting a difference between the threshold value and the second signal into a current signal, and a current comparator for comparing the current signal to a threshold, wherein the offset unit is configured to combine the correction current with the current signal generated by the voltage-to-current converter prior to being compared by the current comparator.

14. The detector pixel according to claim 4, wherein, in the calibration mode, the reference value and the threshold value both equal a common value, and in which mode the offset unit determines a correction signal to be provided to the detecting unit, and/or to the comparing unit in addition to the second signal generated by the detecting unit,
wherein, in the detecting mode, the reference value is equal to a first reference value and the threshold value to a first threshold value, and in which mode the offset unit provides the determined correction signal to the detecting unit, and/or to the comparing unit in addition to the second signal generated by the detecting unit, for correcting an offset in the detecting unit and/or comparing unit, and
wherein, in the calibration mode, the common value is equal to the first threshold value or wherein, in the calibration mode, the common value is equal to the first reference value.

15. The detector pixel according to claim 4, wherein the detecting unit comprises a charge sensitive amplifier for converting the first signal into a voltage signal, and a shaper circuit for differentiating and integrating the voltage signal to thereby generate the second signal,
wherein the shaper circuit comprises an operational transconductance amplifier having a first input connected to an output of the charge sensitive amplifier through a first resistor and a first capacitor, and an output connected to the first input through a parallel connection of a second capacitor and a second resistor, and, wherein the operational transconductance amplifier further comprises a second input for receiving a reference voltage equal to the reference value.

16. The detector pixel according to claim 4, wherein the detector pixel comprises a plurality of said comparing units, offset units, and counters, each comparing unit being associated with a respective offset unit and counter, wherein each comparing unit is associated with a different threshold value used when the detector pixel operates in the detecting mode,
wherein the detector pixel is configured to be operable in a respective calibration mode for each comparing unit, and
wherein the comparing units are configured to substantially simultaneously compare the second signal to the respective thresholds using a common reference value when the detector pixel operates in the detecting mode.

17. The detector pixel according to claim 14, further comprising a controller for setting the threshold value to the first threshold voltage and for setting the reference value to the first reference value when switching from the calibration mode to detecting mode and/or for setting the threshold value and the reference value to the common value when switching from the calibration mode to detecting mode.

18. The detector pixel according to claim 14, the detector pixel comprising one or more switches for setting the threshold value to the first threshold value, for setting the reference value to the first reference value, and/or for setting the threshold value and the reference value equal to the common value, in response to one or more control signals, wherein the detector pixel is preferably configured to receive the one or more control signals from a controller external to the detector pixel.

19. The detector pixel according to claim 7, wherein the controller is configured to:
determine, when the detector pixel operates in the calibration mode, whether the second signal is higher or lower than the threshold voltage based on the comparison result; and
change a value of the correction signal relative to a starting value of the correction signal until the correction signal has a value that is at or close to a value of the correction signal that would cause the comparison result to change,
wherein the controller is configured to change the correction signal based on successive approximation, and
wherein the offset unit comprises an offset register configured to hold an offset correcting value, and wherein the correction signal generating unit is configured to generate the correction signal based on the offset correcting value held in the offset register, and wherein the controller is configured to change the offset correcting value held in the offset register for the purpose of said changing the value of the correction signal.

* * * * *